(12) United States Patent
Chen

(10) Patent No.: US 6,314,179 B1
(45) Date of Patent: Nov. 6, 2001

(54) EXTERNALLY DIALED HAND-FREE OPERATOR FOR CELLULAR PHONES

(75) Inventor: Tonny Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 09/375,497

(22) Filed: Aug. 17, 1999

(51) Int. Cl.$^7$ ........................................ H04M 1/00
(52) U.S. Cl. .................. 379/388.02; 379/420.01; 379/444
(58) Field of Search .................. 379/444, 446, 379/420, 454, 455, 40, 430, 388.02, 420.01

(56) References Cited

U.S. PATENT DOCUMENTS 5,588,041 * 12/1996 Meyer, Jr. et al. ............... 379/446
5,673,304 * 9/1997 Connor et al. ..................... 379/40

* cited by examiner

Primary Examiner—Jack Chiang
(74) Attorney, Agent, or Firm—Rosenberg, Klein & Lee

(57) ABSTRACT

A hand-free operator can be externally dialed via a dialing device. It is more particularly related to an external dialing device, which can be applied to all kinds of cellular phones. Thereby people do not have to keep telephone numbers in memory, they can make direct dials on a hand-free operator by means of telephone numbers stored in advance in a memory unit of a dialing device. It mainly houses a hand-free operator circuit and a dial processing unit in a hand-free operator embodiment that operate in collaboration with a signal cable and a dialing device (DTMF acoustic generator). It enables people to make a dial on cellular phones of all kinds via a hand-free operator without memorizing phone numbers or resorting to phone books, effectively facilitating the use of cellular phones and advancing driving safety.

7 Claims, 2 Drawing Sheets

EXTERNALLY DIALED HAND-FREE OPERATOR FOR CELLULAR PHONES

BACKGROUND OF THE INVENTION

The present invention relates to hand-free operator permitting a user to make a dial externally, and more particularly to an external dialing device adaptable for use on all kinds of cellular phones. It can advance driving safety and facility of using cellular phone.

Generally, it is the most annoying thing to common people to locate phone numbers when using a phone. So, to help people make dials ready and fast, conventional dialing devices have been commercialized on markets. Thereby people can make dials by inputting simplified codes into a dialing device which causes the dialing device to pick up a telephone number stored in advance in a memory unit thereof for dialing operation. The only thing a person using the prior dialing device is to bring such a dialing device close to a common telephone receiver so that DTMF sound produced by the dialing device can be received by a phone receiver. That will do it. It is simple and facilitating However, in nowadays, cellular phones becomes so popular in modern societies, the conventional dialing devices can not be applied thereto for the following reasons:

1. In the cellular phones, there is no DTMF decoding unit provided, so the DTMF sound can not activate a cellular phone to make a dial.
2. Each kind of cellular phone adopts its own communication protocol, for instance the codes for instruction wordings SEND, END, 0,1 . . . 9 are different. So, a dialing device can not be used at all.

The inventor has noticed the problem of conventional dialing devices being not able to be applied to cellular phones. He worked hard to come up with a dialing device equipped with a dial processing unit in a hand-free operator so that it can be operated in cooperation with a dialing device to make a direct dial on a cellular phone possible.

SUMMARY OF THE INVENTION

Therefore, the primary object of the present invention is to provide an externally dialed hand-free operator for use on cellular phones of all kinds, which can be externally dialed via a dialing device. The present hand-free operator is equipped with a dial processing unit and other related circuits. Thereby a user of a cellular phone can make use of a hand-free operator in cooperation with a dialing device to make a dial directly without reaching for a cellular phone and making a digit-by-digit dialing operation. After that the user can make direct use of the hand-free operator, advancing driving safety.

DETAILED DESCRIPTION OF THE PREFERRED EMBODIMENTS

Figure 1:
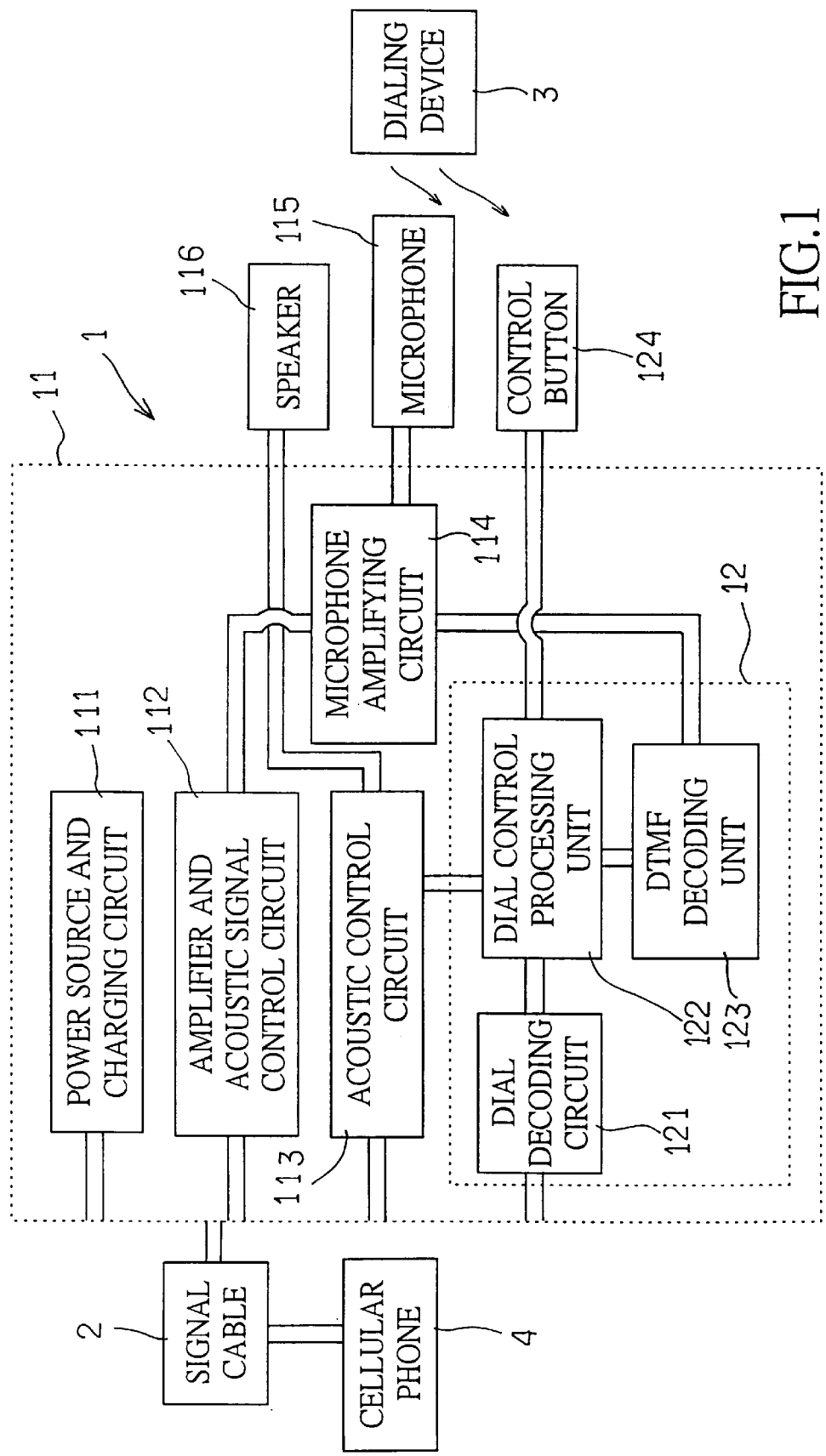
FIG. 1 is a block diagram of the present invention.

Referring to FIG. 1, the block diagram of the present invention shows that in the hand-free operator embodiment 1 of the externally dialed hand-free operator for cellular phones are housed a hand-free operator circuit 11, a dial processing unit 12, operating in combination with a signal cable 2 and a dialing device (DTMF acoustic generator).

The hand-free operator circuit 11 includes a power source and a charging circuit 111, an amplifier, an acoustic quality processing unit 112, an acoustic signal control circuit 113, a microphone amplifying circuit 114, a microphone 115 and a speaker 116 (earphone). Such a hand-free operator is commonly available and its functional circuit is a typical art, so there is no need to detail it hereinafter.

The dial processing circuit 12 includes a cellular phone dial decoding IC or circuit 121, a dial control processing unit 122, a DTMF decoding unit and a control button 124. The cellular phone dial decoding IC or circuit serves to translate a dial into codes acceptable by a cellular phone 4 so as to make a dialing operation on a cellular phone possible. The dial control processing unit 122 effects control on a cellular phone to be ready in a dialing status when the dialing device 3 is in operation.

The control button 124 is used to activate a cellular phone and make a hand-free operator ready for reception of DTMF signals. The DTMF decoding unit 12 is able to decode the DTMF signals transmitted by the dialing device 3 and translate the same into the dialing codes accepted by the cellular phone 4 via the cellular phone dial decoding IC or circuit 121.

The signal cable 2 is a flexible cord 21 having one end equipped with a first plug head 22 engaged with a connection socket of a cellular phone 4 and the other end equipped with a second plug head 23 engaged with a coupling socket of a hand-free operator So it permits signals to be transmitted between the cellular phone 4 and the hand-free operator 1. Since the signal cable is a commonly known device, no detailed description of the structure thereof is given hereinafter.

The dialing device 3 is provided with a DTMF acoustic generator unit and a memory unit. The DTMF acoustic generator unit can translate phone numbers in stored in the memory unit into DTMF codes. The memory unit permits a user to input telephone numbers or data for simple-coded dialing operations and later usage. Such a dialing device is a common device and it is not necessary to detail the structure thereof hereinafter.

Thereby when a user is ready for operating on a cellular phone 4, the control button 124 is first pressed to activate the dial processing unit 122 of the hand-free operator 1 and then the dialing device 3 is directly used to input simplified codes (phonetic sound or the like); and the dialing device 3 is brought close to the input end of the hand-free operator 1. As the dialing device 3 locates a to-be-dialed phone number input and stored in advance by a user in the memory unit, the phone number is translated into DTMF codes for output As soon as the hand-free operator receives the DTMF codes, the DTMF decoding unit 123 of the dial processing unit 12 starts to decode. At the same time, the dial control processing unit 122 activates the cellular phone 4 into a standby state for dialing operation. After the DTMF decoding unit completes its decoding operation, the cellular phone dial decoding IC or circuit 121 starts dialing to get the telephone connected by the dialed number.

Figure 2:
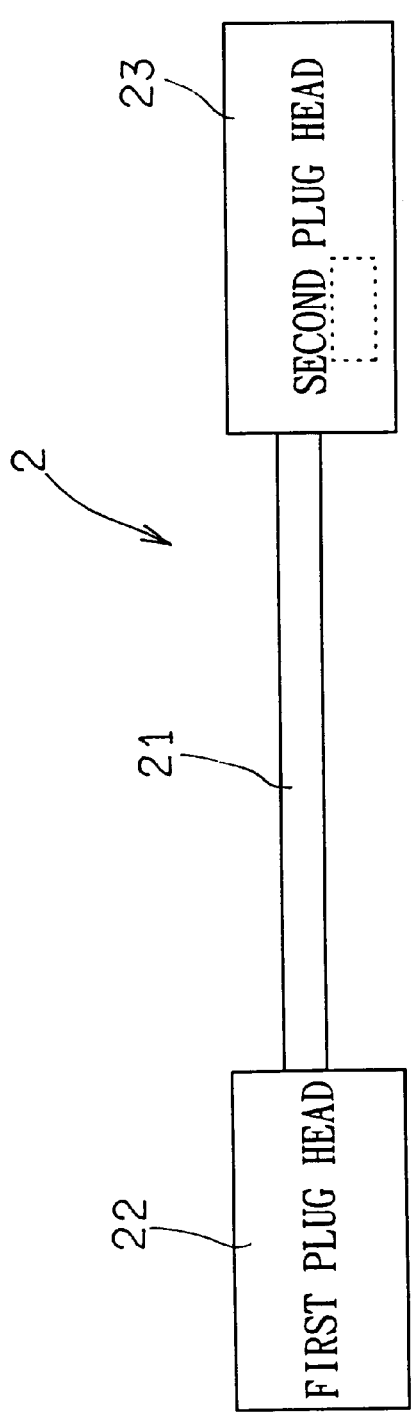
FIG. 2 is a diagram showing a first type signal cable of the second embodiment of the present invention.
Figure 3:
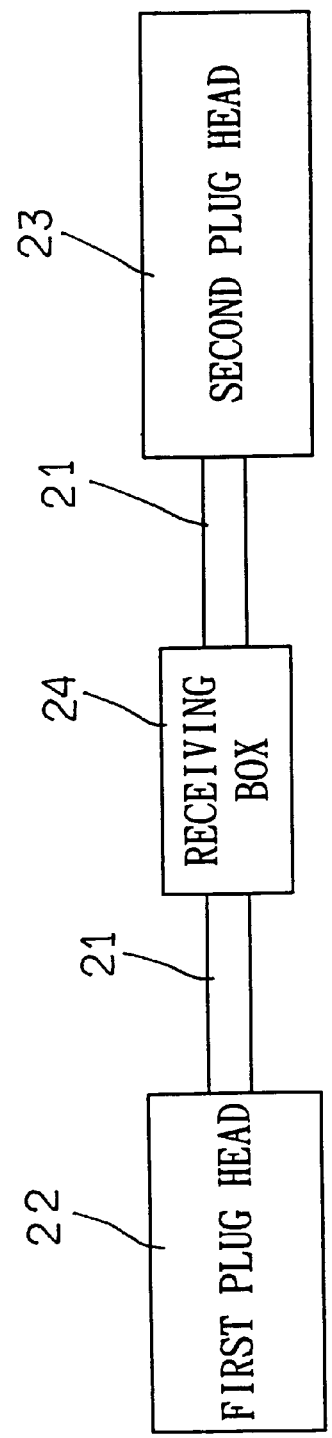
FIG. 3 is a diagram showing a second type signal cable of the second embodiment of the present invention.

Moreover, as shown in FIGS. 2, 3, cellular phones have been developed in such a fast speed and their styles and functions vary from one to one. A single hand-free operator can not be adapted to all kinds of cellular phones at all, or a user already has been equipped with a hand-free operator. For this reason, a dial processing unit 12 can be housed in a connector plug 22 or 23 at either end of the signal cable 2. Alternatively, in a second embodiment of the present invention, between the connector plugs 22, 23 of the signal cable is disposed a receiving box 24 for housing the dial processing unit 12.

I claim:

1. An externally dialed hand-free system for cellular telephones, comprising:

a cellular telephone adapted to transmit dialing signals for telephone numbers provided as dialing code signals to an input thereof, a dialing device selectively providing acoustic DTMF tones representing a predetermined telephone number to be dialed; and, an hand-free operator circuit coupled to said input of said cellular telephone by a signal cable, said hand-free operator circuit including:

(a) a microphone receiving said acoustic DTMF tones, (b) an amplifying circuit coupled to said microphone for amplifying electrical signals from said microphone, (c) a dial processing circuit having an input coupled to an output of said amplifying circuit and an output coupled to said cellular telephone input for converting said received DTMF tones to said dialing code signals, and (d) a control switch coupled to said dial processing circuit for activating said dial processing circuit to process said DTMF tones subsequently output from said dialing device.

2. The externally dialed hand-free system as recited in claim 1, wherein said hand-free operator circuit is enclosed within a connector plug of the signal cable.

3. The externally dialed hand-free system as recited in claim 1, wherein said hand-free operator circuit is enclosed within a housing disposed between connector plugs disposed at opposing ends of the signal cable.

4. The externally dialed hand-free system as recited in claim 1, wherein said dial processing circuit includes a DTMF decoding unit coupled to said output of said amplifying circuit for decoding said electrical signals representing said DTMF tones.

5. The externally dialed hand-free system as recited in claim 4, wherein said dial processing circuit includes a dial control processing unit coupled to an output of said DTMF decoding unit and said control switch to receive decoded dialing signal from said DTMF decoding unit and activate said cellular telephone into a state for dialing.

6. The externally dialed hand-free system as recited in claim 5, wherein said dial processing circuit further includes a dial decoding circuit having an input coupled to an output of said dial control processing unit and an output coupled to said input of said cellular phone for converting said decoded dialing signals to said dialing code signals.

7. An externally dialed hand-free system for cellular telephones, comprising:

a cellular telephone adapted to transmit dialing signals for telephone numbers provided as dialing code signals to an input thereof;

a dialing device selectively providing acoustic DTMF tones representing a predetermined telephone number to be dialed; and, an hand-free operator circuit coupled to said input of said cellular telephone by a signal cable, said hand-free operator circuit including:

(a) a microphone receiving said acoustic DTMF tones, (b) an amplifying circuit coupled to said microphone for amplifying electrical signals from said microphone, (c) a DTMF decoding unit coupled to an output of said amplifying circuit for decoding said electrical signals representing said DTMF tones, (d) a dial control processing unit coupled to an output of said DTMF decoding unit to receive decoded dialing signals from said DTMF decoding unit, (e) a control switch coupled to said dial control processing unit for initiating said dial control processing unit to process said decoded dialing signals and activate said cellular telephone into a state for dialing, and (f) a dial decoding circuit having an input coupled to an output of said dial control processing unit and an output coupled to said input of said cellular phone for converting said decoded dialing signals to said dialing code signals.

\* \* \* \* \*